United States Patent [19]

Mawhinney

[11] Patent Number: 4,647,931
[45] Date of Patent: Mar. 3, 1987

[54] DUAL FREQUENCY IDENTIFICATION SYSTEM

[75] Inventor: Daniel D. Mawhinney, Livingston, N.J.

[73] Assignee: RCA Corporation, Princeton, N.J.

[21] Appl. No.: 676,094

[22] Filed: Nov. 29, 1984

[51] Int. Cl.⁴ ............................................. G01S 13/80
[52] U.S. Cl. ................................................... 342/44
[58] Field of Search ............ 343/6 A, 6.5 LC, 6.5 SS, 343/6.8 LC; 340/505; 375/67, 87, 88; 342/42–51

[56] References Cited

U.S. PATENT DOCUMENTS

| | | | |
|---|---|---|---|
| 2,461,456 | 2/1949 | Usselman | 375/66 |
| 2,644,036 | 6/1953 | Jones | 375/88 |
| 3,223,925 | 12/1965 | Florac, Jr. et al. | 375/66 |
| 3,984,835 | 10/1976 | Kaplan et al. | 343/6.5 SS |

OTHER PUBLICATIONS

R. Graf, *Dictionary of Electronics;* (1974), pp. 467–468.

Primary Examiner—T. H. Tubbesing
Assistant Examiner—Bernarr Earl Gregory
Attorney, Agent, or Firm—Joseph S. Tripoli; Robert L. Troike; Raymond E. Smiley

[57] ABSTRACT

An identification system comprising one or more tags and an interrogator. A tag is responsive to a radio frequency signal transmitted from the interrogator for phase modulating the signal alternately with a first frequency and a second frequency depending on a preselected code and for re-radiating the phase modulated signal back to the interrogator.

2 Claims, 2 Drawing Figures

DUAL FREQUENCY IDENTIFICATION SYSTEM

BACKGROUND OF INVENTION

1. Field of Invention

This invention is concerned with an identification system involving an interrogator and coded tags, and more particularly with such a system involving dual frequency tags.

2. Description of the Prior Art

Many identification systems are known which involve a transmitting and receiving interrogator transmitting a microwave or other radio frequency signal and one or more tags, attached to an object to be identified, which re-radiate the transmitted frequency either unmodified or modified to some degree. One of the more common type identification systems is that found in retail establishments where clothing offered for sale by the store is tagged to prevent theft. The tag consists of a frequency doubler, which is usually nothing more than a diode operating non-linearly. The interrogator continuously transmits frequency A and when a tag is in the vicinity of the interrogator, the interrogator receives, re-radiated from the tag, frequency 2A.

In more sophisticated systems, the tag is coded in some way to uniquely identify the tagged object, a vehicle, for example. Such tags alternately modulate and not modulate the interrogating signal to thereby return a unique code to the interrogator. The tendency of such systems to fluctuate widely in amplitude makes the likelihood of receiving incorrect codes quite high.

SUMMARY OF THE INVENTION

In accordance with a preferred embodiment of the present invention an identification system comprises an interrogator for transmitting a radio frequency signal and a tag comprising means receptive of the radio frequency signal for phase modulating the signal alternately at a first non-zero rate and a second non-zero rate in accordance with a preselected code and re-radiating the thus modulated signal to the interrogator.

DETAILED DESCRIPTION

Figure 1:
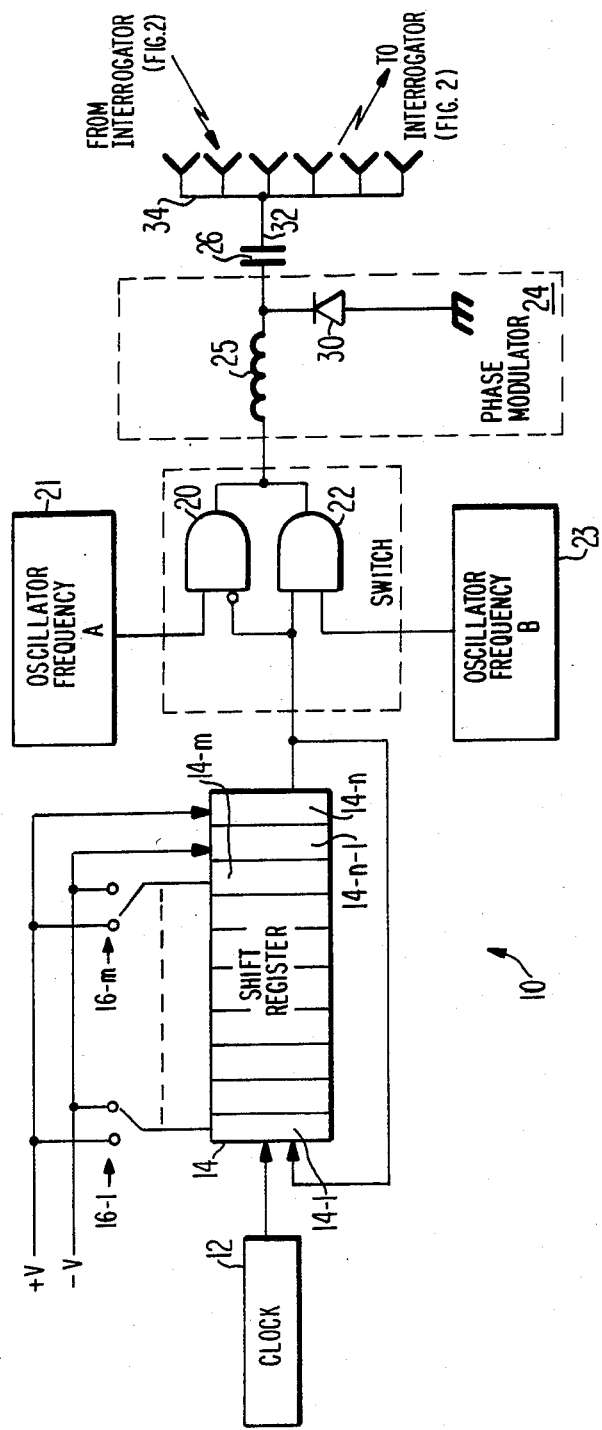
FIG. 1 is a codeable tag in electronic block and schematic form in accordance with a preferred embodiment of the present invention.

Referring now to FIG. 1, a codeable tag 10 includes a master timing clock 12 coupled to a multiple stage parallel-in serial-out n stage shift register 14. Clock 12, which produces, for example, square wave output may be the type of crystal oscillator typically found in a digital watch divided down to produce 1024 hertz. A series of m single-pole double-throw switches 16-*l* . . . 16-*m* are connected between sources of two voltages levels $+V$ and $-V$ on one hand and associated 14-*l* . . . 14-*m* stages of the shift register 14 on the other hand. The voltage levels are connected directly to other positions of the shift register. Thus, by way of example, $+V$ is connected directly to exemplary stage 14-*n*-1 and $-V$ is connected directly to exemplary stage 14-*n* where, in the exemplary tag n=m+2. The voltage levels $+V$ and $-V$ relate to logic levels 1 and 0, respectively. The last position of shift register 14, stage 14-*n*, is connected to the first stage 14-*l* for data recirculating purposes. In reality the fixed values must be unique in some way such as a given relatively large number of stages set to one polarity or such as a code to which the switches will never be set. This is all well known to those of ordinary skill in the art.

Each time clock 12 produces a pulse, the contents of the shift register are shifted to the next higher numbered stage and the contents of stage 14-*n* are shifted out of the shift register and back into stage 14-*l*. The output of shift register 14 is also coupled to the inverting and noninverting inputs, respectively, of AND gates 20 and 22, respectively, which are in reality analog switches. An oscillator 21 operating at frequency A, 1000 kilohertz (kHz) being exemplary, is coupled to the second input of AND gate 20. A second oscillator 23 operating at frequency B, 1228 kHz being exemplary, is coupled to second input of AND gate 22. Oscillators 21 and 23 like the oscillator of clock 12 may be digital watch crystal oscillators for accuracy, low cost and low power drain. The outputs of AND gates 20 and 22 are ORed together and coupled to a phase modulator 24.

Phase modulator 24 comprises a choke 25 coupled between the output of AND gate 20 and 22 and the combination of DC blocking capacitor 26 and the cathode of A microwave varactor or mixer diode such as an HP-5082-2217 Schottky mixer diode manufactured by Hewlett-Packard, San Jose, Ca. The anode of diode 30 is system grounded. The distel end of capacitor 26 is coupled via a length of transmission line 32 to an appropriate transceiving antenna 34. One particularly suitable type of transceiving antenna is a printed circuit array antenna of the type described and claimed in U.S. Pat. No. 3,587,110 issued to O. M. Woodward on June 22, 1971 and assigned to applicant's assignee.

Figure 2:
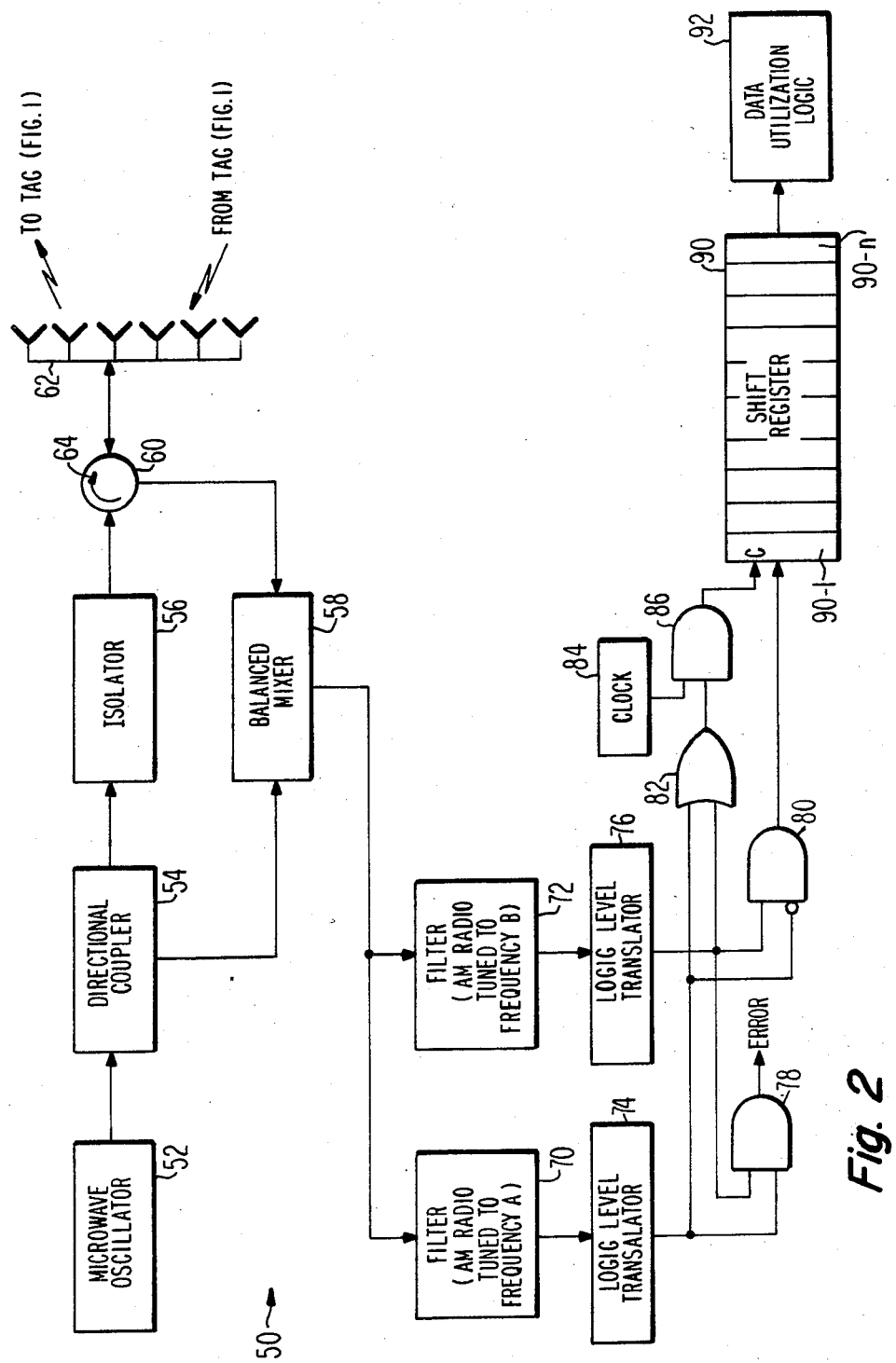
FIG. 2 is an interrogator for use with the tag illustrated in electronic block and logic form in accordance with a preferred embodiment of the present invention.

Antenna 34 receives radio frequency signals from and re-radiates modulated signals back to the interrogator illustrated in FIG. 2 to which attention is now directed. In FIG. 2 a microwave oscillator 52 producing by way of example a 10.5 gigahertz (GHz) signal is coupled to a directional coupler 54. Directional coupler 54 is coupled to an isolator 56 and also coupled to one input of a balanced mixer 58 to provide thereto a local oscillator signal. The output of isolator 56 is coupled to a three-port microwave circulator 60. A second port of circulator 60 is coupled to antenna 62 which may be similar to the aforementioned antenna 34 utilized in tag 10 of FIG. 1. The third port of circulator 60 is coupled to the second input of balanced mixer 58. The arrow 64 within circulator 60 illustrates the direction of signal flow. Components 52–62 are of standard design and arrangement.

The output of balanced mixer 58 is coupled to filters 70 and 72. Filter 70 is adapted to pass frequency A from tag 10 FIG. 1 while filter 72 is adapted to pass frequency B from tag 10 FIG. 1. With the exemplary frequency A of 1000 kHz and the exemplary frequency B of 1228 kHz filters 70 and 72 may simply be standard AM car radios tuned to pass those respective frequencies.

As a practical matter considering the small number of interrogators usually in a system it is cheaper to provide AM radios for use as filters than to design special purpose filters. Suitable radios which in fact not only include AM but also include FM and cassette players and can be digitally tuned typically sell for under one hundred dollars.

The output of filter 70 is coupled to a logic level translator 74 while the output 72 is coupled to a logic level translator 76. The output of translator 74 is coupled to an input of AND gate 78 the an inverting input of AND gate 80 and an input of OR gate 82. The output of translator 76 is coupled to a second input of each of AND gates 78 and 80 and a second input of OR gate 82. The output of AND gate 78 is coupled to suitable error circuitry not illustrated. The output of OR gate 82 and a clock 84 are connected to respective inputs of AND gate 86. The output of AND gate 86 is coupled to the clock terminal of a shift register 90 while the output of AND gate 80 is coupled to the data input of shift register 90. Clock 84 is set to operate at the same frequency as clock 12 in tag 10, FIG. 1. The output of shift register 90 is coupled to a suitable data utilization logic circuit 92.

In operation, microwave oscillator 52 transmits an unmodulated microwave signal through directional coupler 54, isolator 56, circulator 60 to antenna 62 where it is radiated to antenna 34, FIG. 1 if antenna 34 is in the field of the signal from antenna 62. If tag antenna 34 is not so positioned, the signals reaching the two inputs of balanced mixer 58 are identical, the output is 0 and no signal passes through filters 70 and 72. With no signal passing through filters 70 and 72 both translators 74 and 76 produce logic 0 signals and thus both inputs to OR gate 82 and its output are at a logic 0. Therefore, AND gate 86 is disabled such that there is no shifting of data through shift register 90.

However, when a tag 10 FIG. 1 is present, a different operation occurs as described now. Whether or not an interrogating signal is reaching antenna 34, tag 10 operates as follows. Upon initial turn-on or every n+2 pulses from clock 12 a pattern identifying tag 10 is loaded in parallel into shift register 14. The logic for accomplishing this task is very straightforward and therefore not illustrated. The logic 0 and logic 1 signals loaded into the various positions in shift register 14 are determined by the setting of switches 16-*l* . . . 16-*m* and signals hardwired into the shift register as exemplified by those wired to positions 14-*n*-1 and 14-*n*.

Once the various logic 1 and logic 0 bits are loaded into shift register 14, they are continuously circulated through the shift register by clock 12. A exemplary rate for clock 12 is 1024 hertz. Depending on whether register 14-*n* contains a logic 0 or a logic 1, at any point in time, AND gate 20 or AND gate 22 is enabled. If AND gate 20 is enabled, a signal at frequency A is passed to phase modulator 24. If AND gate 22 is enabled, frequency B is passed to phase modulator 24. Because of the various potentials involved, diode 30 becomes alternately an open circuit or short circuit at the frequency A or frequency B, respectively. The alternate open and short circuit is seen as a change in impedance when viewed from antenna 34.

When a microwave signal is received from interrogator 50, FIG. 2, the change in impedance at the rate of frequency A or frequency B causes a phase change in the signal reflected back to antenna 34. That phase changed signal is re-radiated back to interrogator 50 of FIG. 2 and particularly to antenna 62 thereof. Unlike the prior art in which only at most a single frequency is utilized, so long as the tag 10 of FIG. 1 is receiving a microwave signal, it is sending back a signal which clearly is indicative of either frequency A or frequency B. Thus, no ambiguity exists as would be the case with a signal sending either nothing or frequency A for example.

Returning to FIG. 2, the re-radiated phase modulated signal from antenna 34, FIG. 1, appearing at antenna 62 is passed by circulator 60 to balanced mixer 58. Mixer 58 subtractively mixes the transmitted signal as coupled by directional coupler 54 into mixer 58 with the phase modulated return signal transmitted via circulator 60 to balanced mixer 58 to thereby remove the microwave signal leaving only the phase modulated signal difference between the transmitted and received signals which appears at the output of mixer 58 as either frequency A or frequency B. If at any instant in time oscillator 21 is modulating the microwave signal appearing at antenna 34, frequency A is present at the output of mixer 58, and passes through filter 70 causing translator 74 to produce a logic 1. Alternatively, if at any given instant in time oscillator 23 is modulating the signal received at antenna 34, frequency B is present at the output of mixer 58, and passes through filter 72 causing translator 76 to produce a logic 1 signal. When frequency A is absent, translator 74 produces a logic 0 signal and when frequency B is absent, translator 76 produces a logic 0 signal. If both frequency A and frequency B are present at the same time, this is an error condition in which case logic 1 signals would be applied to both inputs of gate 78 causing it to be enabled and to thus produce an error signal. When translator 74 produces a logic 0 signal and translator 76 produces a logic 1 signal AND gate 80 is enabled to pass a logic 1 signal to first stage 90-1 of shift register 90. Similarly when translator 74 produces a logic 1 and translator 76 produces a logic 0, AND gate 80 is disabled producing a logic 0 which is passed to stage 90-1 and shift register 90. With a logic 1 present from either translator 74 or translator 76, OR gate 82 is enabled priming AND gate 86 to accept clock pulses from clock source 84 to thus clock the information into shift register 90.

Eventually, shift register 90 will thus contain the same pattern of 1's and 0's as is present in shift register 14 of tag 10 in FIG. 1. The fixed information from shift register 14 and the information in shift register 14 determined by the settings of various switches 16 will thus be passed to data utilization logic 92, FIG. 2, to be used for any suitable purpose. Data utilization logic 92 may be, for example, a display displaying the number set into tag 10 by switches 16-*l* . . . 16-*m* and thus identify the vehicle or other object to which tag 10 is attached. Additionally or alternatively logic 92 may be a computer programmed to keep track of the whereabouts of tags 10 and thus the object to which they are attached.

It will be understood that a typical system will consist of one or a few interrogators 50 and a relatively large number of tags 10. Depending on the particular system employed it may be that each tag will contain a different code determined by the setting of its switches 16 or it may be that several tags will share the common set of codes determined by the setting of switches 16. Although a system employing microwave frequencies has been described, a system employing lower radio frequencies will work but with less antenna directivity for a given size antenna than at microwave frequencies. Further, the oscillators in the tags may be powered from local power supplies (batteries, for example) or may be powered from the radio frequency signal transmitted from the interrogator 50.

What is claimed is:

1. An identification system comprising, in combination:
   an interrogator for transmitting a radio frequency signal; and
   a tag including means receptive of said radio frequency signal for phase modulating said signal alternately at a first non-zero frequency and a second non-zero frequency in accordance with a preselected code and including means for re-radiating the thus modulated signal to said interrogator,
   said tag further including means producing a digital code signal for identifying said tag, which code signal is said preselected code, and further including a clock source coupled to said means producing said digital code signal for causing said code signal to be produced at a rate determined by the frequency of said clock,
   said interrogator further including means for demodulating the radio frequency component of the returned signal to thus produce a signal alternating between said first frequency and said second frequency and further including first and second amplitude modulated (AM) radios, each radio having a tuner adjustable over a band of frequencies, said tuners being tuned to pass said first and second frequencies respectively for passing signals indicative of said first and second frequencies, respectively, when present.

2. An identification system comprising in combination:
   an interrogator for transmitting a radio frequency signal; and
   a tag including means receptive of said radio frequency signal for phase modulating said signal alternately at a first non-zero frequency and a second non-zero frequency in accordance with a preselected code and including means for re-radiating the thus modulated signal to said interrogator,
   said interrogator further including means for demodulating the radio frequency component of the returned signal to thus produce a signal alternating between said first frequency and said second frequency and further including first and second amplitude modulated radios, each radio having a tuner adjustable over a band of frequencies, said tuner being tuned to said first and second frequencies respectively for passing signals indicative of said first and second frequencies, respectively, when present.

* * * * *